United States Patent [19]

Theodore et al.

[11] Patent Number: 4,861,819

[45] Date of Patent: * Aug. 29, 1989

[54] WIPER BLADE COMPOSITIONS

[75] Inventors: Ares N. Theodore, Farmington Hills; Paul C. Killgoar, Jr., Livonia, both of Mich.

[73] Assignee: Ford Motor Company, Dearborn, Mich.

[*] Notice: The portion of the term of this patent subsequent to Feb. 24, 2004 has been disclaimed.

[21] Appl. No.: 115,801

[22] Filed: Nov. 2, 1987

[51] Int. Cl.$^4$ ................................................ C08K 5/01
[52] U.S. Cl. .................................. 524/491; 524/490; 524/481; 524/483; 15/250.36; 15/250.42
[58] Field of Search ................ 524/490, 491, 481, 483

[56] References Cited

U.S. PATENT DOCUMENTS 4,616,060 10/1986 Killgoar, Jr. ........................ 524/574
4,645,791 2/1987 Theodore et al. ................... 524/490

*Primary Examiner*—Joseph L. Schofer
*Assistant Examiner*—Peter D. Mulcahy
*Attorney, Agent, or Firm*—Lorraine S. Melotik; Roger L. May

[57] ABSTRACT

This invention relates to an environmentally durable composition which has excellent low temperature dynamic properties. The composition comprises a substantially homogeneous mixture of 100 parts by weight elastomer having a fully saturated backbone, curing agent for the elastomer in amounts sufficient to crosslink the elastomer, reinforcing particulate filler, at least 20 parts by weight of an aliphatic oil and paraffinic oil and/or naphthenic oil. Inclusion of the naphthenic oil and/or paraffinic oil with the aliphatic oil improves the overall properties and processability of the elastomer composition. Particulate graphite may be incorporated into the composition to lower its friction.

22 Claims, No Drawings

WIPER BLADE COMPOSITIONS

TECHNICAL FIELD

This invention relates to an improved environmentally durable elastomer composition which has excellent low temperature dynamic properties. More particularly, the elastomer composition comprises elastomer having a fully saturated backbone, curing agent for the elastomer, reinforcing particulate filler and particularly defined aliphatic oil, wherein the improvement comprises further including particularly defined naphthenic oil and/or paraffinic oil therein.

BACKGROUND ART

Elastomer compositions made of natural rubber generally have good low temperature dynamic properties. However, because elastomers like natural rubber have unsaturated backbones, they are subject to chemical changes caused by environmental attack of the composition by, e.g., ultraviolet light, heat, oxygen, and ozone during use. These chemical changes in the elastomer, generally by means of reactions at the unsaturated sites, change its physical properties. Consequently, the composition begins to harden and takes a set. If such a composition has been used to form, e.g., wiper blades, the blades will no longer conform well to the windshield curvature. In order to overcome problems associated with poor environmental durability, elastomer compositions have been made from elastomers, such as ethylene-propylene-diene rubber (EPDM), which have a fully saturated backbone. Since these elastomers do not possess any reactive sites in their backbone, compositions comprising them possess excellent environmental degradation resistance. One such composition, employed for windshield wiper blades, is disclosed by Killgoar, Jr. in U.S. Pat. No. 4,616,060, assigned to the assignee of this invention. The windshield wiper composition disclosed therein comprises elastomer having a fully saturated backbone, curing agent, reinforcing particulate and graphite. The graphite is incorporated into the windshield wiper composition to reduce the coefficient of friction of the blade material.

However, at temperatures below about 0° C., such elastomer compositions, while having excellent environmental durability, display dynamic properties (i.e., flexibility) that are generally inferior to those of many natural rubber compositions. The properties of the elastomer compositions may be modified by incorporating additives into the compositions. However, the inclusion of a particular additive into the compositions may improve one property of the composition while having a deleterious effect on another property. For example, naphthenic oils, which are often added to improve the processing of elastomer compositions, generally degrade the low temperature dynamic properties of the elastomer composition. U.S. Pat. No. 4,645,791, assigned to the assignees of the present invention, discloses that the low temperature dynamic properties of environmentally durable elastomer compositions, such as those comprising EPDM, can be improved by incorporating particularly defined aliphatic oil therein.

BRIEF DESCRIPTION OF THE INVENTION

This invention is directed to an improved environmentally durable elastomer composition which has improved processability and excellent low temperature dynamic properties. The composition comprises a substantially homogeneous mixture of: (a) 100 parts by weight elastomer having a fully saturated backbone, (b) curing agent for the elastomer in an amount sufficient to crosslink the elastomer, (c) reinforcing particulate filler, and (d) at least 20 parts by weight, more preferably between about 30 and about 90 parts by weight, aliphatic oil selected from aliphatic oils having a number average molecular weight ($\overline{M}_n$) between about 250 and about 1500, wherein at least 90% by weight, preferably greater than about 98% by weight, of the aliphatic oil boils above about 200° C., wherein the improvement comprises including in the composition at least about 2 parts by weight modifying oil selected from the group consisting of: (i) naphthenic oils having (a) a number average molecular weight ($\overline{M}_n$) between about 300 and about 500 and (b) a pour point between about −30° F. and about +25° F.; (ii) paraffinic oils having (a) a number average molecular weight ($\overline{M}_n$) between about 300 and about 1000 and (b) a pour point between about 0° F. and about 10° F.; and (iii) mixtures of (i) and (ii). The naphthenic oil is included in the composition in an amount preferably between about 2 and about 40 parts by weight and/or the paraffinic oil is included in the composition in an amount preferably between about 3 and about 50 parts by weight. The weight of each oil being based on 100 parts by weight of elastomer having a fully saturated backbone. The aliphatic oil can optionally include small amounts of additives conventional to such oils, e.g., antioxidants, viscosity index improvers and defoamants, which are compatible with the oil and substantially non-reactive with the elastomer composition.

The elastomer composition of this invention may be employed as a windshield wiper material. If such use is desired, particulate graphite is preferably incorporated into the composition of this invention to modify its frictional properties. Preferably, when the composition of this invention is employed as a windshield wiper composition, the elastomer having a saturated backbone comprises or consists essentially of ethylene-propylene-diene rubber (EPDM), the curing agent comprises an accelerated sulfur curing system, and the reinforcing filler comprises carbon black. The aliphatic oil is included in the wiper composition in an amount of between about 20 and about 60 parts by weight, and the friction modifying graphite is included in an amount of between about 20 and about 100 parts by weight (the weight of the oil and the graphite individually being based on 100 Parts by weight of the EPDM).

Advantageously, cured materials made from the elastomer composition of this invention possess excellent environmental degradation resistance as well as good low temperature dynamic properties. Due to the use of the particularly defined naphthenic and/or paraffinic oil, in addition to the aliphatic oil, the compositions of this invention exhibit improved processability over similar compositions without the particular naphthenic oil and/or paraffinic oil of the present invention composition. Furthermore, the compositions of this invention constitute more cost effective compositions for the manufacture of articles therefrom, e.g., wiper blades.

DETAILED DESCRIPTION OF THE INVENTION

The invention of this application is directed to an environmentally durable elastomer composition which has excellent low temperature dynamic properties. The composition of this invention comprises a substantially homogeneous mixture of: elastomer having a fully saturated backbone, curing agent for the elastomer, reinforcing particulate filler, aliphatic oil and, according to the improvement of the invention, modifying oil selected from naphthenic oil and/or paraffinic oil. Each of these components, as well as optional materials which may be included in the composition, will be discussed hereinafter in detail.

The composition of this invention comprises elastomer having a fully saturated backbone, i.e., elastomer wherein a continuous path can be traced from one end of the elastomer polymer to the other without going through a double bond. Many such elastomers having a fully saturated backbone are known to those skilled in the art. Exemplary of numerous such elastomers having a fully saturated backbone which may be employed in the composition of this invention are ethylene-propylene-diene rubber (EPDM), commercially available as Epcar (trademark, Polysar Ltd., Sarnia, Canada), Vistalon (trademark, Exxon, Houston, Texas), Nordel (trademark, DuPont, Wilmington, Delaware), and Epsyn (trademark, Copolymer Rubber Chemicals Corp., Baton Rouge, LA). Other suitable elastomers having a saturated backbone include ethylene propylene rubber, available, e.g., as Epcar (trademark, Polysar Ltd., Sarnia, Canada), Royalene (trademark, Uniroyal, Naugatuck, Conn.), Vistalon (trademark, Exxon, Houston, Texas), and Epsyn (trademark, Copolymer Rubber Chemicals Corp.). Saturated nitrile elastomers which may similarly be employed include, but are not limited to, Therban (trademark, Mobay Chemical, Pittsburgh, Pa.). Still other elastomers having a saturated backbone comprise chlorosulfonated polyethylene, available commercially as Hypalon (trademark, DuPont).

The elastomer employed in the composition of this invention may be a mixture of two or more different elastomers having a fully saturated backbone, such as those described above. In addition to the elastomer having a fully saturated backbone, the composition of this invention may include a minor proportion of elastomer having an unsaturated backbone, e.g., polyisoprene or bromobutyl rubber, as a modifying elastomer. However, in order to maintain maximum environmental durability of the composition, it is most preferable not to include any such elastomers having an unsaturated backbone in the composition.

The composition of this application also includes curing agent for the elastomer in an amount which is sufficient to crosslink the elastomer. As would be apparent to one in the art, if elastomer having an unsaturated backbone is included in the composition of this invention, sufficient curing agent would be employed to cure the elastomer having the fully saturated backbone and the elastomer having an unsaturated backbone. The selection of the particular curing agent and the optimal amount to be employed for a particular elastomer composition is dependent upon, e.g., desired physical properties and compatibility with the process used to form the cured composition, as is known to those skilled in the art, and thus such selection would be within the skill of those in the art. Typically, such curing agents include, but are not limited to, sulfur systems, e.g., conventional sulfur, efficient and semi-efficient accelerated sulfur systems, peroxide curing agents, etc. Such systems are well known in the art, and are widely described in literature, e.g., "Vulcanization and Vulcanizing Agents", W. Hoffman, Maclaren and Sons Ltd., London, 1967, which is hereby expressly incorporated by reference in this application for such teachings.

Another component of the composition of this invention is reinforcing particulate filler, which comprises organic or inorganic particulate, or mixtures thereof. Examples of preferred organic and inorganic particulate include carbon black, zinc oxide, fine particle calcium carbonates, silicas and silicates. The amount and type of reinforcing filler to be employed in the composition of this invention would be based on the desired properties and use of the elastomer composition of this invention. Selection of the optimal amount and type of filler to be employed would be within the skill of one in the art.

As discussed above, the excellent low temperature dynamic properties of the elastomer composition result from the inclusion of particularly defined naphthenic oil and/or paraffinic oil in addition to particularly defined aliphatic oil in the elastomer composition. At least 20 parts by weight of the aliphatic oil is included in the composition based on 100 parts by weight of the elastomer having a fully saturated backbone. Preferably, the amount of aliphatic oil included in the composition is between about 20 and 60 parts by weight based on 100 parts by weight of the elastomer having a fully saturated backbone, which is employed in the composition. The aliphatic oil is selected from aliphatic oils having a number average molecular weight ($\overline{M}_n$) between about 250 and about 1500, preferably a number average molecular weight ($\overline{M}_n$) between about 350 and 700. Additives which are compatible with the oil may be included in the aliphatic oil as long as such additives are substantially non-reactive with the elastomer composition. Aliphatic oils which are suitable for use in the present invention have a very low volatile content, i.e., at least 90% by weight, preferably greater than about 98% by weight of the aliphatic oil boils above 200° C. These aliphatic oils, in addition to modifying the low temperature dynamic properties of the elastomer composition of the invention also improve its processability. As is known in the art, the processability of an elastomer composition is related to such factors as its ability to be easily molded, e.g., due to the softness and flowability of the composition, and to the ability of the composition to be loaded with reinforcing particulate such as carbon black. Exemplary of the aliphatic oils which may be employed in this invention are synthetic paraffinic mineral oils, including synthetic hydrocarbon basestock lubricating oils, available, e.g., from Mobil Oil Corporation. Mobil's synthetic hydrocarbon basestock lubricating oil was found to lose only about 0.08% of its weight when heated at 160° C. for 700 minutes. Such synthetic basestock lubricating oils, or blends of such synthetic basestock lubricating oils, which have been modified for use as engine oils by the incorporation of an additive system may also be employed as the aliphatic oil in this invention. (Generally this additive system provides high detergency and dispersancy and resistance to thermal and oxidative instability, and offers wear and corrosion protection, as required during engine use). Exemplary of such engine oils which may be employed as the aliphatic oil of the composition of this invention include, but are not limited to, those available from Mobil Oil Corp., e.g., Mobil 1 (trademark, Moil Oil Corp.) synthetic motor oil and Delvac 1 (trademark, Mobil Oil Corp.) synthetic fleet engine oil. The aliphatic oil employed in this invention may be a mixture of aliphatic oils comprising, e.g., such synthetic hydrocarbon basestock lubricating oils and/or synthetic engine oils.

As discussed above, the improvement of this invention comprises including in the elastomer composition at least 2 parts by weight modifying oil selected from particularly defined (i) naphthenic oils, (ii) paraffinic oils and (iii) mixtures of these naphthenic oils and paraffinic oils. Preferably, the modifying oil is selected from between about 2–40 parts by weight of the defined naphthenic oils, between about 3–50 parts by weight of the defined paraffinic oil an mixtures thereof.

The naphthenic oil is selected from naphthenic oils having a number average molecular weight ($\overline{M}_n$) between about 300 and about 500, preferably a number average molecular weight ($\overline{M}_n$) between about 350 and about 500, and a pour point between about $-30$ and about $+25°$ F. Naphthenic oils which are suitable for use in the present invention have a very low volatile content, i.e., preferably at least 86%, more preferably at least 93%, most preferably greater than about 97% by weight of the naphthenic oil boils above 107° C. (ASTM method D972-81). The naphthenic oil employed in this invention may be a mixture of such naphthenic oils. Exemplary of the commercially available naphthenic oils which may be employed in this invention are those of the Circosols and Sunthene (trademarks, Sun Refining and Marketing Co., Philadelphia, Pa.) series, the latter series being Preferred for use in this invention. Exemplary of such naphthenic oils suitable for use in this invention are Synthene 255, 450, 380, 4130 and 4240, the latter three being most preferred for use herein. These oils, made by hydrotreating Circosol (trademark) naphthenic oils, are lighter in color and possess excellent resistance to discoloration by heat and ultraviolet light. By means of this refining process, polar compounds containing nitrogen, sulfur and oxygen are minimized in the resulting oils. The high aromatic compound content of the oil is maintained which provides for optimal compatibility with the elastomer composition. Exemplary of other commercially available naphthenic oils which may be employed in this invention are those obtained from Exxon, (Houston, Tex.), e.g., Flexon 690 and Flexon 680 (trademark) and Shell Chemical Company (Houston, Tex.), e.g., Shellflex 371 and Shellflex 412 (trademark). These oils have properties such as molecular weight and volatile content similar to those of the Sun Refining and Marketing Co. naphthenic oils described above. The commercially available naphthenic oils useful in the present invention may, in addition to the naphthenic component, comprise fractions of other oils such as aromatic oils and paraffinic oils. These naphthenic oils, when incorporated into the composition of this invention with the particularly defined aliphatic oils, improve the overall properties of the composition, e.g., physical properties and dispersion of ingredients are improved.

The paraffinic oil is selected from paraffinic oils having a number average molecular weight ($\overline{M}_n$) between about 300 and about 1000, preferably a number average molecular weight ($\overline{M}_n$) between about 400 and about 800, and having a pour point between about 0° F. and about 10° F., preferably about 5° F. Paraffinic oils which are suitable for use in the present invention have a very low volatile content, i.e., preferably at least 87%, more preferably at least about 99% by weight of the paraffinic oil boils above 100° C. (ASTM method D972-81). The paraffinic oil employed in this invention may be a mixture of such paraffinic oils. These oils are characterized structurally by saturated rings and long paraffinic side chains (66% minimum Cp). Since they are highly saturated, they are resistant to oxidation and color degradation by ultraviolet light. Exemplary of commercially available Paraffinic oils which may be employed in this invention are those of the Sunpar (trademark, Sun Refining and Marketing Co., Philadelphia, Pa.) series, such as Sunpar 120, 130, 150, 2170 and 2280. Other commercially available paraffinic oils which may be employed as the paraffinic oil in this invention include those obtained from Exxon, e.g., Flexon 815 and Flexon 865 (trademark) and Shell Chemical Company, e.g., Shellflex 790 and Shellflex 1790 (trademark), which have properties such as molecular weight and volatile content similar to the Sunpar (trademark) oils. The paraffinic oils employed in the present composition exhibit excellent compatibility with the elastomer employed in this invention composition. Commercially available paraffinic oils which may be employed in the present invention may comprise fractions of other oils, e.g., aromatic and naphthenic components.

As discussed above, the composition of this invention may also be employed as a windshield wiper composition. Preferably, the saturated backbone elastomer of the windshield wiper blade composition comprises EPDM and employs an accelerated sulfur curing system. The reinforcing particulate in such a windshield wiper composition preferably comprises carbon black, generally in an amount of between about 15 and about 100 parts by weight, based on 100 parts by weight of the elastomer having a fully saturated backbone. The preferred carbon blacks for use in the windshield wiper composition have an average particle size of 20-60 nm (nanometer) and are employed most preferably in the composition in an amount of from about 30 to 70 parts by weight per hundred parts by weight of such elastomer.

As taught above, when employing the present invention composition to make windshield wiper blades, graphite is preferably incorporated into the elastomer composition in order to reduce the coefficient of friction of the windshield wiper. In order to reduce the friction of the blades, preferably at least about 20 parts by weight particulate graphite is incorporated in the elastomer composition (based on 100 parts by weight of elastomer having a fully saturated backbone). In one preferred embodiment of the windshield wiper elastomer composition, wherein the elastomer having a fully saturated backbone comprises EPDM, the elastomer composition preferably comprises between about 20 and about 100 parts by weight particulate graphite per 100 parts by weight of EPDM. The particle size of the graphite employed in the windshield wiper composition is not limited to any particular particle size. Mixture of particle sizes may also be employed. More particularly, the optimal particle size to be employed in the composition would be suggested in part, by the method of manufacture of the blades. Selection of preferred particle size would be within the skill of those in the art. Graphite is readily commercially available as, for example, Dixon 1176, Dixon 200-42, and Dixon 1355 (trademark, The Joseph Dixon Crucible Co., Jersey City, N.J.). Aliphatic oil is included in the windshield wiper composition in an amount of at least 20 parts by weight as discussed above based on the weight of the elastomer having the fully saturated backbone. Preferably, when the elastomer having the fully saturated backbone is EPDM, the aliphatic oil is included in the windshield wiper composition in an amount of between about 20 and about 60 parts by weight, based on 100 parts by weight of the EPDM. The windshield wiper composition also comprises preferably at least 2 parts by weight of the naphthenic oil and/or preferably at least 3 parts by weight of the paraffinic oil defined above, each individually based on 100 parts by weight of the elastomer. More preferably, the windshield wiper composition comprises between about 5 and about 40 parts by weight of the naphthenic oil and/or between about 6 and about 50 parts by weight of the paraffinic oil, based as defined above.

The elastomer composition of this invention may optionally include other materials commonly employed in such formulations. These optional materials include non-reinforcing fillers such as $CaCO_3$, clay, etc., cure activators such as stearic acid and zinc oxide; and other additives such as desiccants like CaO. Still other materials like antioxidants may be included in the composition. While it is known that, e.g., in compounding ethylene-propylene type rubbers, added antioxidants may not be required, they may be beneficial in many cases. Antioxidants include, e.g., polymerized quinolines, hindered amines, phenols and the like known in the art. Selection and amount of optimal materials which would be employed in the composition would be dependant on the use and desired properties of the composition. As such, their selection would be within the skill of those in the art in view of the present disclosure.

The composition of this invention may be employed to make, e.g., windshield wiper blades and ring seals, as would be apparent to those skilled in the art. In making an article from the composition, the elastomer composition is first mixed together to form a substantially homogeneous mixture, generally in a Banbury type mixer or on two roll rubber mills, generally the curing agent being incorporated last, whereafter the composition is formed into the article and cured. Alternatively, the composition may be formed and cured whereafter the article is formed from the cured elastomer. The method of making the composition and forming the article from the composition is not limited to any particular method.

The following test methods were employed in evaluating the compositions described in the examples set forth below.

Testing Methods

Tensile testing of dumbbell Specimens procedure is sued for determination of tensile strength and elongation to break. Dumbbell specimens are cut with the standard die C from a thin slab (0.25–0.35 cm thick) and used for this testing.

Tear testing: Tear specimens, cut with a die B, are tested according to ASTM D 624 procedure. Razor-nicked specimens are used for determination of tear resistance.

Durometer Hardness: The hardness of compression set buttons is determined according to ASTM D 2240 procedure.

Compression set. %: Compression set testing was done according to ASTM D 395 (method B) on compression set buttons. The test conditions were 22 hours at 85° C. under 25% compression in a ventilated, air circulating oven.

Dynamic Mechanical Properties: Dynamic properties such as Log E' (storage modulus), Log E' (loss modulus) and Tan δ (loss were obtained with a Dynamic Mechanical Thermal Analyzer (Polymer Laboratories Limited). The dual cantilever mode of testing was used with the specimen in the form of a rectangular bar. Typical bar dimensions were: length 7.00 mm, width 6.45 mm and thickness 2.70 mm. The specimens were cooled to −120° C. and then heated at 1° C. per minute from −90° C. to 25° C. The dynamic mechanical thermal analyzer was interfaced with a Hewlett Packard 9816 computer and 7475A plotter. Log E', Log E'', and Tan 67 were plotted as a function of temperature. Testing was carried out at frequencies of 0.1, 1.0 and 10 HZ.

The invention will be further understood by referring to the following detailed examples. It should be understood that the specific examples are presented by way of illustration and not by way of limitation.

EXAMPLE 1

Compounds for the manufacture of windshield wiper blades were obtained by mixing the following ingredients in the amounts indicated below:

| Ingredient | Amount (grams) |
| --- | --- |
| EPDM (Epcar 585[1]) | 390.00 |
| HAF-HS Carbon black (N-347[2]) | 117.00 |
| Stearic acid | 3.90 |
| Zinc oxide | 19.50 |
| Calcium Oxide | 19.50 |
| Mobil Synthetic Hydrocarbon basestock lubricating oil[3] | 100.00 |
| Paraffinic Process oil (Sunpar 2280[4]) | 96.00 |
| Graphite, (Dixon 1355[5]) | 232.00 |
| 2-mercaptobenzothiaole | 7.75 |
| Tetramethylthiuram disulfide | 3.10 |
| a[1] | 3.10 |
| Sulfur #104 (Rubbermakers[6]) | 3.10 |
| Dipentamethylenethiuram hexasulfide | 3.10 |

[1]Trademark, Polysar Ltd.
[2]ASTM Designation
[3]Obtained from Mobil Oil Corp.
[4]Trademark, Sun Refining & Marketing Company, Philadelphia, PA.
[5]Trademark, The Joseph Dixon Crucible Co.
[6]Trademark, Harwick Chemical Corp., Akron, Ohio, sulfur An internal Banbury mixer (Model BR) was employed for mixing the above ingredients according to the following schedule: initially all dry components were mixed with the oil blend (Mobil synthetic hydrocarbon oil and paraffinic process oil) for one minute. EPDM was introduced in the banbury mixing chamber and mixed for four minutes with the other ingredients. Then the curative system was added to the mixture and mixing was continued for one more minute. The mix (Compound I) was dumped and further mixed on a 200×400 mm two-roll mill while it was still warm. A second mix (Compound II) was made as described above except that it contained an equal amount of paraffinic oil (Sunpar 2280, trademark) in place of the oil blend. Thermal gravimetric analysis indicated that the weight loss of Compound I during molding was very close to that of Compound II, reflecting the similar processability of these compounds.

Compound I and II were molded into specimens at 160° C. for 24 minutes. Testing of molded specimens from compounds I & II indicated that the paraffinic oil of the blend provides for the improved compatibility of ingredients and the overall improved physical properties while the synthetic hydrocarbon oil particularly accounts for the improved low temperature flexibility.

In the table below, the dynamic mechanical properties of the two compounds are listed as an indication of their low temperature behavior.

| Compound | Log E', Pa (1 HZ, 20° C.) | Tan δ 1 HZ, Peak ° C. |
|---|---|---|
| Compound I | 6.85 | −46 |
| Compound II | 6.90 | −34 |

The above data not only indicates that the low temperature flexibility of Compound I is better than that of Compound II but also very close to that of production natural rubber. However, the natural rubber material is substantially inferior in weathering and compression set.

Windshield wiper blades were molded in a compression mold by heating the material at 160° C. for 23 minutes. The resulting blades were free of external or infernal flows. They also exhibited low friction and good wipe quality.

EXAMPLE 2

The procedure of Example 1 for making Compound I was repeated with the exception that the paraffinic oil (Sunpar 2280, trademark, Sun Refining and Marketing Co., Philadelphia, Pa.) of the oil blend was replaced by an equal amount of refined naphthenic oil (Sunthene 4240, trademark, Sun Refining and Marketing Company). Testing of molded specimens indicates that the naphthenic oil containing compound exhibits a small improvement in Physical properties such as tensile strength and tear strength over that of the paraffinic containing Compound I, likely due to the higher aromatic content of naphthenic oil. The incorporation of the synthetic hydrocarbon oil provides for the suitable low temperature behavior of the compound. Blades molded under the same conditions as in Example 1 have a very smooth surface and exhibit good frictional properties.

EXAMPLE 3

The procedure of Example 1 (Compound I) was repeated with the following differences: The paraffinic oil was replaced with 50.00 grams of naphthenic oil (Sunthene 4240, trademark, Sun Refining and Marketing Company,) and 50.00 grams of a paraffinic oil (Sunpar 130, trademark, Sun Refining and Marketing Co.). The resulting mix had acceptable volatility (0.75% by weight) compared to (0.40% by weight) for Compound I of Example 1. Although tan δ (peak= −47° C.) for the compound of this example was close to that of Compound I of Example 1, the elastic modulus (Log E'=6.80 Pa) was slightly lower. Blades molded at 160° C. for 20 minutes exhibited a good surface profile (edge). The friction of these blades was close to that of blades molded from Compound I from Example 1.

EXAMPLE 4

A compound was prepared according to the procedure in Example 1 (Compound I) except that 50 grams of the paraffinic oil (Sunpar 2280, trademark, Sun Refining and Marketing Co., Philadelphia, Pa.) were replaced by 50.00 grams of a naphthenic oil (Sunthene 255, trademark, Sun Refining and Marketing Company). The material compounded in this way exhibited fairly low volatility during molding. As a result, blades molded at 155° for 25 minutes had a very smooth surface. The frictional properties of the blades were acceptable.

EXAMPLE 5

A compound was made according to the procedure of Example 1 (Compound I) with the exception that 40.00 grams of the paraffinic oil (Sunpar 2280 trademark, Sun Refining and Marketing Co., Philadelphia, Pa.) were replaced with 40.00 grams of another paraffinic oil (Sunpar 150, trademark, Sun Refining and Marketing Co., Philadelphia, Pa.). The resulting material exhibited low volatility when heated at 160° C. for 30 minutes (0.60% by weight) and was formed into molded parts without defects. Windshield wiper blades prepared from this material had a good appearance. The blades also exhibited good durability and low friction.

EXAMPLE 6

The procedure of Example 2 (Compound I) was repeated with the exception that the naphthenic oil was replaced with 30.00 grams of another naphthenic oil (Sunthene 225, trademark, Sun Refining and Marketing Company) and 40.00 grams of a paraffinic oil (Sunpar 130, trademark, Sun Refining and Marketing Co., Philadelphia, Pa.). The mix exhibited acceptable processability. When parts were molded at 150° C. for 30 minutes they displayed acceptable low temperature dynamic mechanical properties. Blades molded from this compound had good overall properties.

EXAMPLE 7

An elastomer compound was prepared by mixing the following components for 6 minutes in a Banbury mixer according to the schedule of Example 1:

| Ingredient | Amount (grams) |
|---|---|
| EPDM Elastomer (Ecar 585[1]) | 400.00 |
| HAF-HS Carbon Black (N-351[2]) | 120.00 |
| Stearic acid | 3.95 |
| Zinc Oxide | 20.00 |
| Mobil Synthetic hydrocarbon basestock lubricating oil[3] | 100.00 |
| Paraffinic oil (Sunpar 2280[4]) | 50.00 |
| Naphthenic oil (Sunthene 4240[5]) | 72.00 |
| Graphite, (Dixon 220-42[6]) | 232.00 |
| 2 Mercaptobenzothioale | 7.80 |
| Tetramethylthiuram disulfide | 3.10 |
| a[2] | 3.10 |
| Sulfur #104 (Rubbermakers[7]) | 3.10 |
| Dipentamethylene thiuram hexasulfide | 3.10 |

[1]Trademark, Polysar Ltd.
[2]ASTM Designation
[3]Obtained from Mobil Oil Corp.
[4]Trademark, Sun Refining & Marketing Company, Philadelphia, PA.
[5]Trademark, Sun Refining and Marketing Company
[6]Trademark, The Joseph Dixon Crucible Co.
[7]Trademark, Harwick Chemical Corp., Akron, Ohio, sulfur The above elastomer compound had very good processability. Wiper blades were molded from the elastomer compound at 160° C. for 22 minutes. They exhibited good physical properties and good low temperature dynamic mechanical properties.

EXAMPLE 8

The procedure of Example 7 was repeated with the exception that the graphite, Dixon 200-42 (trademark, The Joseph Dixon Crucible Co., Jersey City, N.J.), was replaced by an equal amount of another graphite, Dixon 1176 (trademark, The Joseph Dixon Crucible Co., Jersey City, N.J.). The stock was molded at 150° C. for 27 minutes into wiper blades. The wiper blades had wipe quality and frictional properties very close to that of the compound formulated in Example 7.

EXAMPLE 9

The procedure of Example 3 was repeated with exception that the amount of Mobil Synthetic Hydrocarbon Oil was increased to 120.00 grams. The mix molded well at 160° C. for 20 minutes. Test specimens displayed slightly lower dynamic mechanical properties. Blades based on this material had a very smooth surface.

EXAMPLE 10

The procedure of Example 3 for making the compound was repeated with the exception that the amount of synthetic hydrocarbon oil was reduced to 80.00 grams. The rubber stock was moldable and the resulting parts had fairly good acceptable properties.

EXAMPLE 11

Compounds were made according to the procedures of Examples 1 (Compound I), 2 and 3 except that the Mobil Synthetic Hydrocarbon Oil was replaced by an equal amount of Mobil 1 (trademark, Mobil Oil Corp.) Motor Oil. The weight losses of these compounds heated at 160° C. for 20 minutes were close to those of the compounds described in Examples 1 (Compound I), 2 and 3. Wiper blades molded under the same conditions displayed no defects and had good frictional properties.

EXAMPLE 12

Examples 1 (Compound I), 2, and 3 were repeated except that the Mobil Synthetic Hydrocarbon Oil was replaced by an equal amount of commercially available Delvac 1 (trademark, Mobil Oil Corp.) synthetic fleet engine oil. The overall properties of these compounds were very close to those of the compounds in Examples 1 (Compound I), 2 and 3. Wiper blades molded from these compounds at 160° C. for 20 minutes had good frictional properties.

EXAMPLE 13

A compound was made according to the procedure of Example 2 with the exception that Sunthene 4240 (trademark, Sun Refining and Marketing Company) was replaced with Circosol 4240 (trademark, Sun Refining and Marketing Company). Wiper blades molded from this compound had acceptable properties.

EXAMPLE 14

A compound was made according to the procedure of Example 1 with the following differences: 190.00 grams of carbon black (N-347) and 150.00 grams graphite, Dixon 1355 (trademark, The Joseph Dixon Crucible Co.), were employed in preparing the mix. The compound was moldable and displayed slightly improved physical properties such as tensile and tear strength.

EXAMPLE 15

The procedure of Example 1 for making compound I was repeated with the following differences: 300.00 grams graphite, Dixon 1355 (trademark, The Joseph Dixon Crucible Co.) were used in preparing a compound. The compound was molded at 160° C. for 20 minutes and exhibited slightly lower friction when compared to Compound I of Example 1.

EXAMPLE 16

The following materials were mixed as in Example 1 for preparation of an EPDM/natural rubber blend.

| Component | Amount (grams) |
| --- | --- |
| EPDM (Epcar 585[1]) | 330.00 |
| Natural rubber (SMR-SL[2]) | 70.00 |
| HAF-HS Carbon black (N-347[3]) | 160.00 |
| Stearic acid | 4.00 |
| Zinc oxide | 20.00 |
| Mobil synthetic hydrocarbon basestock lubrication oil[4] | 100.00 |
| Paraffinic oil (Sunpar 2280[5]) | 100.00 |
| Graphite, (Dixon 1355[6]) | 232.00 |
| 2-mercaptobenzothiaole | 7.80 |
| Tetramethylthiuram disulfide | 3.10 |
| a[3] | 3.10 |
| Sulfur #104 (Rubbermakers[7]) | 3.10 |
| Dipentamethylenethiuram hexasulfide | 3.10 |
| Calcium oxide | 20.00 |

[1]Trademark, Polysar Ltd.
[2]Akron Chemical Co., Akron, Ohio
[3]ASTM Designation
[4]Obtained from Mobil Oil Corp.
[5]Trademark, Sun Refining & Marketing Company, Philadelphia, PA.
[6]Trademark, The Joseph Dixon Crucible Co.
[7]Trademark, Harwick Chemical Corp., Akron, Ohio, sulfur The above compound was molded at 155° C. for 20 minutes and exhibited good properties.

EXAMPLE 17

A compound was formulated according to the procedure of Example I except that EPDM (Epcar 585, trademark, Polysar, Ltd.) was replaced by an equal amount of Royalene 505 (trademark, Uniroyal, Naugatuck, Conn.). Blades molded from this rubber stock exhibit low friction and good wipe quality.

While particular embodiments of the invention have been described, it will be obvious to those skilled in the art that various changes and modifications may be made without departing from the invention, and it is intended to cover in the appended claims all such modifications and equivalents as fall within the true spirit and scope of this invention.

We claim:

1. An improved elastomer composition comprising a substantially homogenous mixture of:
   (a) 100 parts by weight of elastomer having a fully saturated backbone;
   (b) curing agent for said elastomer in amount sufficient to crosslink said elastomer;
   (c) reinforcing particulate filler;
   (d) at least 20 parts by weight aliphatic oil having a number average molecular weight of between about 250 and about 1500, wherein at least 90% by weight of said aliphatic oil boils above about 200° C.; and
   (e) at least 2 parts by weight modifying oil selected from the group consisting of:
      (i) naphthenic oil having a number average molecular weight between about 300 and about 500 and a pour point between about −30° F. and about +25° F.;
      (ii) paraffinic oil having a number average molecular weight between about 400 and about 1000 and a pour point between about 0° F. and about 10° F.; and
      (iii) mixtures of (i) and (ii).

2. The elastomer composition according to claim 1, wherein greater than 98% by weight of said aliphatic oil boils above about 200° C.

3. The elastomer composition according to claim 1, wherein said aliphatic oil is included in said composition in an amount of between about 30 and about 90 parts by weight based on 100 parts by weight of said elastomer.

4. The elastomer composition according to claim 1, wherein said aliphatic oil has a number average molecular weight ($\overline{M}_n$) of between about 350 and about 700.

5. The elastomer composition according to claim 1, wherein said aliphatic oil is selected from (i) synthetic paraffinic mineral oils, (ii) synthetic paraffinic mineral oil based engine oils, and (iii) blends thereof.

6. The elastomer composition according to claim 5, wherein said aliphatic oil is selected from synthetic hydrocarbon basestock lubricating oils and engine oils based on synthetic hydrocarbon basestock lubricating oils.

7. The elastomer composition according to claim 1, wherein said reinforcing particulate filler is selected from organic and inorganic particulate.

8. The elastomer composition according to claim 1, wherein said modifying oil is selected from the group consisting of:
   (i) between about 2 and about 40 parts by weight said naphthenic oil; and
   (ii) between about 3 and about 50 parts by weight said paraffinic oil; and
   (iii) mixtures of (i) and (ii).

9. An elastomer composition according to claim 1, wherein about 86% by weight said naphthenic oil boils above about 107° C.

10. An elastomer composition according to claim 1, wherein about 87% by weight of said paraffinic oil boils above 100° C.

11. The elastomer composition according to claim 1, further comprising at least 20 parts by weight particulate graphite.

12. Windshield wiper blades made from the elastomer composition of claim 11.

13. The elastomer composition according to claim 11, wherein said reinforcing particulate comprises carbon black.

14. The elastomer composition according to claim 13, wherein said composition comprises between about 15 and about 100 parts by weight carbon black.

15. The elastomer composition according to claim 11, wherein said elastomer having a fully saturated backbone comprises ethylene-propylene-diene rubber.

16. The elastomer composition according to claim 15, wherein said curing agent for said elastomer comprises an accelerated sulfur curing system.

17. The elastomer composition according to claim 15, wherein said composition comprising between about 20 and about 60 parts by weight of said aliphatic oil.

18. The elastomer composition according to claim 17, wherein said aliphatic oil is selected from (i) synthetic paraffinic mineral oils, (ii) synthetic paraffinic mineral oil based engine oils, and (iii) blends thereof.

19. An elastomer composition suitable for use as windshield wiper material, which composition comprises a substantially homogenous mixture thereof:
   (a) 100 parts by weight ethylene-propylene-diene elastomer;
   (b) curing agent for said elastomer;
   (c) between about 15 and 100 parts by weight carbon black;
   (d) between about 20 and about 200 parts by weight particulate graphite;
   (e) between about 20 and about 60 parts by weight aliphatic oil having a number average molecular weight (Mn) of between about 250 and about 1500, and wherein at least 90% by weight of said oil boils above about 200° C.; and
   (f) at least 2 parts by weight modifying oil selected from the group consisting of:
      (i) naphthenic oil having a number average molecular weight between 300 and about 500 and a pour point between about −30° F. and about +25° F.;
      (ii) paraffinic oil having a number average molecular weight between about 300 and about 1000 and a pour point between about 500 0° F. to 10° F.; and
      (iii) mixtures of (i) and (ii).

20. Windshield wiper blades made from the composition of claim 19.

21. A method for making windshield wiper blades, which method comprises:
(A) forming a composition comprising a substantially homogeneous mixture of:
   (a) 100 parts by weight of elastomer having a fully saturated backbone;
   (b) curing agent for said elastomer in amount sufficient to crosslink said elastomer;
   (c) at least 25 parts by weight particulate graphite;
   (d) reinforcing particulate filler;
   (e) at least 20 parts by weight aliphatic oil having a number average molecular weight ($\overline{M}_n$) of between about 250 and about 1500, wherein at least 90% by weight of said aliphatic oil boils above about 200° C.; and
   (f) at least 2 parts by weight modifying oil selected from the group consisting of:
      (i) naphthenic oil having a number average molecular weight between about 300 and about 500 and a pour point between about −30° F. and about +25° F.;
      (ii) paraffinic oil having a number average molecular weight between about 400 and about 1000 and a pour point between about 0° F. and about 10° F.
      (iii) mixtures of (i) and (ii); and
(B) forming said composition into said windshield wiper blades; and
(C) curing said composition of said windshield wiper blades.

22. Wiper blades made according to the method of claim 21.

* * * * *